Figure 1:
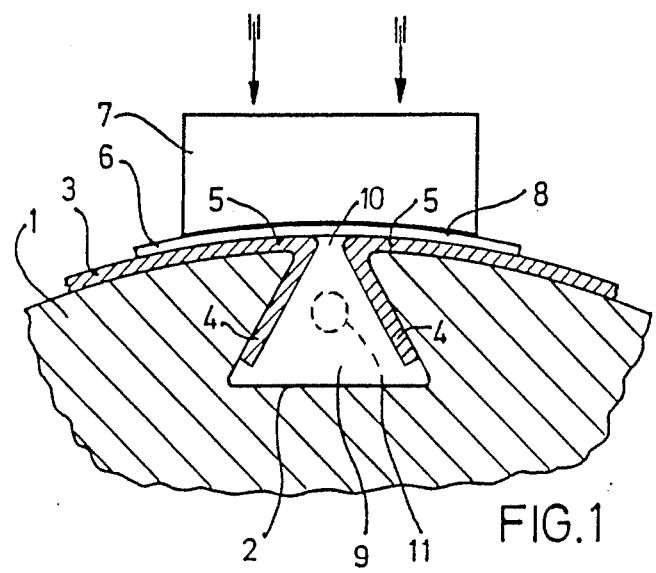

United States Patent [19]

Lynch

[11] Patent Number: 4,934,714
[45] Date of Patent: Jun. 19, 1990

[54] PHOTOCURABLE FILLING COMPOUND, IN PARTICULAR FOR CLOSING THE GAP BETWEEN THE ENDS OF GRAVURE PRINTING PLATES CLAMPED ON FORME CYLINDERS

[75] Inventor: John Lynch, Monsheim, Fed. Rep. of Germany

[73] Assignee: BASF Aktiengesellschaft, Ludwigshafen, Fed. Rep. of Germany

[21] Appl. No.: 295,056

[22] Filed: Jan. 9, 1989

Related U.S. Application Data

[60] Division of Ser. No. 170,627, Mar. 17, 1988, abandoned, which is a continuation of Ser. No. 772,707, Sep. 5, 1985, abandoned.

[30] Foreign Application Priority Data

Sep. 8, 1984 [DE] Fed. Rep. of Germany ....... 3433045

[51] Int. Cl.$^5$ .................. F16J 15/14; B41F 27/06
[52] U.S. Cl. ..................... 277/1; 101/415.1; 522/120; 522/135
[58] Field of Search ............ 101/415.1; 277/1; 522/120, 135

[56] References Cited

U.S. PATENT DOCUMENTS

| | | |
|---|---|---|
| 4,048,035 | 8/1977 | Ide et al. . |
| 4,210,691 | 7/1980 | Bolgiano et al. . |
| 4,340,657 | 7/1982 | Rowe . |
| 4,515,375 | 5/1985 | Bleckmann et al. ............ 277/1 |
| 4,537,855 | 8/1985 | Ide . |
| 4,551,215 | 11/1985 | Sakamoto et al. . |

FOREIGN PATENT DOCUMENTS

| | | |
|---|---|---|
| 0140006 | 5/1985 | European Pat. Off. . |
| 2545618 | 4/1977 | Fed. Rep. of Germany . |
| 2111515 | 7/1983 | United Kingdom . |

OTHER PUBLICATIONS

Deutscher Drucker No. 41 (1975) pp. 17–22.

*Primary Examiner*—Allan M. Lieberman
*Attorney, Agent, or Firm*—Keil & Weinkauf

[57] ABSTRACT

Photocurable filling compounds for closing the gaps which result between the end or edge regions of gravure printing plates when the latter are clamped on forme cylinders consist of a homogeneous, solvent-free, photopolymerizable mixture which is free-flowing at room temperature and contains from 10 to 90% by weight of one or more hydrophilic, polar, photopolymerizable, ethylenically unsaturated low molecular weight compounds, from 5 to 65% by weight of one or more polymeric binders which are resistant to toluene-containing, gasoline-containing, ketone-containing and/or ester-containing solvents and are compatible with the photopolymerizable low molecular weight compounds, from 0.01 to 10% by weight of one or more photoinitiators and from 0 to 70% by weight of further additives and/or assistants.

9 Claims, 2 Drawing Sheets

PHOTOCURABLE FILLING COMPOUND, IN PARTICULAR FOR CLOSING THE GAP BETWEEN THE ENDS OF GRAVURE PRINTING PLATES CLAMPED ON FORME CYLINDERS

This is a division of Ser. No. 170,627, filed Mar. 17, 1988, now abandoned, which is a continuation of Ser. No. 772,707, filed Sep. 5, 1985, now abandoned.

The present invention relates to a photocurable filling compound for producing a toluene-resistant or gasoline-resistant gap closure, in particular for closing a gap between the end or edge regions of gravure printing plates clamped on forme cylinders of a sheet-fed or web-fed rotary gravure press. The photocurable filling compound is particularly suitable for closing such gaps in gravure printing plates which are clamped on forme cylinders and possess a plastic printing layer.

It is known that, for rotary gravure printing, printing plates consisting of a dimensionally stable and flexible support and a printing layer attached to this can be clamped on a gravure printing forme cylinder magnetically or, preferably, mechanically by means of suitable holding and clamping elements. A plurality of printing plates can be fastened one behind the other and side by side on the surface of the forme cylinder. Of importance, however, particularly for web-fed rotary gravure printing, is the use of wrap-around gravure printing plates in which, in order to permit clamping on the forme cylinder, in general one or both ends are bent over and the plate is hooked under tension in a groove running parallel with or obliquely to the forme cylinder axis. Because they are simple to produce, gravure printing plates, including wrap-around gravure printing plates, which consist of a plastic printing layer attached to a dimensionally stable support are of particular importance.

When the gravure printing plates are clamped on the forme cylinder, an interruption in the printing surface in the form of a narrow gap or clamping slot results between the ends of the gravure printing plates and, where a plurality of gravure printing plates are arranged side by side on the forme cylinder, also between the adjacent lateral edges of the plates. For the gravure printing process, this gap must be closed by means of a suitable filling compound in order to prevent penetration of the printing ink into the gap and to ensure smooth running of the doctor blade.

It has been proposed that this gap be filled by inserting or squeezing in a resilient sealing strip or a plastic tape or that the gap be closed by means of a thermoplastic or thermally weldable plastic. DE-A-25 45 618 describes a method for closing the gap in clamped gravure printing plates, in which a two-component mixture which undergoes rapid curing under the action of heat, in particular an epoxy resin, polyester resin or acrylic resin mixture, is introduced into the gap. It has also been proposed that the gap between the end regions of gravure printing plates clamped on forme cylinders be filled with photocurable methacrylate or cyanoacrylate resins, which are then cured by means of polymerization initiated by UV light (cf. Deutscher Drucker, No. 41 (1975), pages 17 to 22).

However, none of the materials proposed to date for gap closure have proven completely satisfactory in practical use. The filling materials are either difficult to handle or do not possess the necessary mechanical and chemical properties, for example adequate resistance to the printing ink solvents or to stress due to the doctor blade. Some of the conventional filling materials readily tend to become brittle, so that fine cracks, which may fill with ink and interfere with the printing, form in the gap region after a short time, or these filling compounds furthermore exhibit insufficient adhesion, with the result that the gap closure may be partly or completely torn out during printing. The heat-curable two-component mixtures described in DE-A-25 45 618 have the disadvantage that they either require long curing times or, where reactive two-component mixtures exhibiting shorter curing times are used, the associated pot lives are so short that they are no longer sufficient to permit processing. The use of photocurable methacrylate or cyanoacrylate resins, as described in Deutscher Drucker (loc. cit.), not only presents problems with regard to the handling of these resins but in this case too the gap closed in this manner is not sufficiently stable to the stresses occurring in the printing process. These conventional, photocurable filling materials have in particular proven to be very brittle, and their adhesion is unsatisfactory, particularly when gravure printing plates with plastic printing layers are used. In spite of the various attempts to solve the problem of closing the gap in gravure printing plates clamped on forme cylinders, there is in practice still a need for a suitable filling compound for closing gaps of this type.

It is an object of the present invention to provide a suitable filling compound for closing the gaps in the printing surface which result when gravure printing plates are clamped on forme cylinders, which filling compound meets the requirements set in practice. In particular, the filling compound should be easy to handle and to process, and, after the gap has been closed, should exhibit good adhesion to the gravure printing plate so that the ends of the latter are thus joined to one another firmly and durably. The gap closure produced using the filling compound should be resistant to the toluene-containing or gasoline-containing printing ink solvents conventionally used in gravure printing, as well as to ketone-containing or ester-containing printing ink solvents, and should possess good mechanical strength and resistance to the stress due to the doctor blade.

We have found, surprisingly, that this object is achieved if the filling compound consists of a homogeneous solvent-free photopolymerizable mixture which is free-flowing at room temperature and contains one or more hydrophilic, polar, photopolymerizable ethylenically unsaturated low molecular weight compounds, one or more polymeric binders which are compatible with these compounds and resistant to printing ink solvents, one or more photoinitiators and, if required, further additives and/or assistants.

The present invention accordingly relates to a photocurable filling compound for closing the gaps which result between the end or edge regions of gravure printing plates when the latter are clamped on forme cylinders, wherein the filling compound consists of a homogeneous, solvent-free photopolymerizable mixture which is free-flowing at room temperature and contains (a) from 10 to 90% by weight of one or more hydrophilic, polar, photopolymerizable, ethylenically unsaturated low molecular weight compounds, (b) from 5 to 65% by weight of one or more polymeric binders which are resistant to toluene-containing, gasoline-containing, ketone-containing and/or ester-containing solvents and are compatible with the photopolymerizable low molecular weight compounds of component (a) and form a homogeneous solution or dispersion with these, (c) from 0.01 to 10% by weight of one or more photopolymerization initiators and (d) from 0 to 70% by weight of further additives and/or assistants, the percentages stated in each case being based on the total mixture for the filling compound.

The novel filling compounds for closing the gap in clamped gravure printing plates are not only simple to handle and easy to use but, after being introduced into the gap and undergoing curing by exposure to actinic light, give a gap closure which meets the requirements set in practice, in particular with regard to adhesion and mechanical properties, such as hardness, toughness and abrasion resistance. Not only does this give a durable and strong gap closure which is superior compared with the prior art and in general has a smooth and non-tacky surface, but it is also possible to introduce ink-receiving wells for the printed image in the regions of the closed gaps; this is particularly important for web printing.

Suitable components (a) of the novel filling compounds are the conventional hydrophilic, polar, photopolymerizable monomers. Particularly preferred monomers are those whose photopolymerizable ethylenic double bonds are activated by conjugation or by virtue of being adjacent to 0, N or S atoms. The photopolymerizable, ethylenically unsaturated low molecular weight compounds employed according to the invention can be either monofunctional or polyfunctional, ie. they may contain one or more photopolymerizable, ethylenic double bonds in the molecule. Surprisingly, we have found that a very good, durable and strong gap closure is obtained if the novel filling compounds predominantly or exclusively contain monofunctional monomers. Accordingly, in a particular embodiment of the invention, component (a) of the filling compounds according to the invention consists solely of monofunctional, photopolymerizable monomers of the type under discussion, or of mixtures of such monomers with a minor amount of polyfunctional, in particular bifunctional, photopolymerizable monomers of the type under discussion.

The hydrophilic, polar, photopolymerizable ethylenically unsaturated low molecular weight compounds used according to the invention as component (a) of the filling compounds include the N-vinyl compounds and the α, β-olefinically unsaturated mono- and dicarboxylic acids and appropriate derivatives of these. Examples of the N-vinyl monomers are the N-vinyllactams, in particular N-vinyl pyrrolidone and N-vinylcaprolactam. Particularly important α, β-olefinically unsaturated carboxylic acids are acrylic acid and methacrylic acid. Other particularly advantageous photopolymerizable monomers are derivatives of α, β-olefinically unsaturated carboxylic acids, in particular derivatives of acrylic or methacrylic acid, such as hydroxyalkyl (meth)acrylates, (meth)acrylamide or derivatives of (meth)acrylamide. Examples of the hydroxyalkyl (meth)acrylates, where alkyl is preferably of 2 to about 20, in particular 2 to 8, carbon atoms, are 2-hydroxyethyl (meth)acrylate, 2-hydroxypropyl (meth)acrylate, 3-hydroxypropyl (meth)acrylate, butane-1,4-diol mono(meth)acrylate and hexanediol mono(meth)acrylate. Other suitable compounds are mono(meth)acrylates of polyalkylene glycols, eg. di-, tri- or tetraethylene glycol mono(meth)acrylate. Examples of the derivatives of (meth)acrylamide, which according to the invention are also suitable monomers, are N-methylol(meth)acrylamide and its diethers with diols, for example the reaction product of 2 moles of N-methylol(meth)acrylamide with one mole of ethylene glycol.

The hydrophilic, polar, photopolymerizable low molecular compounds used as component (a) are chosen in accordance with, inter alia, the type of polymeric binder used as component (b), with which the photopolymerizable low molecular weight compounds should be compatible, and also with the desired properties of the cored filling compound. The said compounds can be employed alone or as a mixture with one another. For example, the mechanical properties of the cured filling compound and hence of the closed gaps can be varied and adjusted to the desired range via the type and amount of monomers used or, where a monomer mixture is employed, also via the ratio of the monomers in the mixture. The novel filling compounds contain in general from 10 to 90, in particular from 30 to 80, % by weight, based on the total filling compound, of the hydrophilic, polar, photopolymerizable low molecular weight compounds. It is also possible to adjust and vary the viscosity of the filling compound by varying the amount of photopolymerizable low molecular weight compounds (a). Filling compounds containing a very large amount of component (a) generally have a particularly low viscosity. Usually, the filling compounds which have a somewhat higher viscosity but still flow readily at room temperature are preferred, since in this case, on the one hand, uniform distribution of the filling compound in the gap cavity is ensured and, on the other hand, no expensive measures are required for sealing the gap cavity at the ends of the cylinder.

In addition, the novel filling compounds contain, as component (b), one or more polymeric binders which are compatible with the photopolymerizable low molecular weight compounds of component (a). The polymeric binder is chosen so that it is resistant to the conventional toluene-containing gasoline-containing, ketone-containing and/or ester-containing printing ink solvents usually employed in gravure printing. A class of very useful polymeric binders comprises the styrene/maleic half ester copolymers. Many of these copolymers contain the styrene and maleic half ester comonomers in a molar ratio of about 1:1. However, it is also possible to use other ratios of the comonomers, and the copolymers may also contain other comonomers, eg. maleic anhydride and/or (meth)acrylates, as copolymerized units. The styrene/maleic half ester copolymers generally have a softening point of above 150, in particular above 180° C., and a mean molecular weight of about 5,000–50,000. Another class of very suitable polymeric binders for the novel filling compounds comprises the linear synthetic nylons, in particular the linear soluble nylon copolymers, which possess repeating amide groups in the main molecular chain, such as those which are known per se as, for example, polymeric binders for photopolymerizable recording materials and are described, inter alia, in French Pat. 1,520,856 and DE-A-22 02 357. Particularly suitable nylon copolymers are those which are prepared by co-condensation of a mixture of one or more lactams, in particular caprolactam, and one or more salts of a diamine with a dicarboxylic acid, for example those prepared from ε-caprolactam, hexamethylenediammonium adipate and the salt of 4,4″-diaminodicyclohexylmethane with adipic acid. The nylons used according to the invention preferably have a K value (according to Fikentscher, Cellulose-Chemie, 13 (1932), 58) of from 20 to 80, in particular from 30 to 70.

Polymeric binders preferably used as component (b) are those which are soluble in the hydrophilic, polar, photopolymerizable, ethylenically unsaturated low molecular weight compounds used as component (a). However, it is also possible to employ, as component (b), polymeric binders which are only dispersible in the said compounds of component (a), provided that the photopolymerizable low molecular weight compounds and the polymeric binders are compatible with one another and can be processed to give a homogeneous free-flowing mixture. The amount of the polymeric binders (component (b)) in the novel filling compounds is in general from 5 to 65, in particular from 10 to 50, % by weight, based on the total filling compound.

In addition to the photopolymerizable, low molecular weight compounds of the type under discussion and the polymeric binders, the novel filling compounds contain, as component (c), one or more photopolymerization initiators, in particular in an amount from 0.01 to 5, preferably from 0.05 to 2, % by weight, based on the total filling compound. According to the invention, suitable photoinitiators for this purpose are the compounds conventionally used as photoinitiators for photocurable materials. These include, in particular, benzoin and benzoin derivatives, such as benzoin alkyl ethers, in particular those where alkyl is of 1 to 8 carbon atoms, eg. benzoin monomethyl ether or benzoin isopropyl ether, α-hydroxymethylbenzoin and its alkyl ethers, such as α-hydroxymethylbenzoin methyl ether, or α-methylbenzoin and its ethers; benzil and benzil derivatives, in particular benzil mohoketals, such as benzil dimethyl ketal, benzil methyl ethyl ketal or benzil methyl benzyl ketal; the acylphosphine compounds which are effective photoinitiators, as described in, for example, German Laid-Open Applications DOS 2,830,927, DOS 2,990,994, DOS 3,020,092, DOS 3,034,697, DOS 3,114,314 and DOS 3,133,419, examples of typical compounds being 2,4,6-trimethylbenzoyldiphenylphosphine oxide, ethyl 2,4,6-trimethylbenzoylphenylphosphinate and 2,4,6-tri-methylbenzoylbis(o-toluyl)phosphine oxide; derivatives of α-hydroxyacetophenone, eg. 1-phenyl-2-hydroxy-2-methylpropan-1-one, 1-(p-isopropylphenyl)-2-hydroxy-2-methylpropan-1-one and 1-hydroxy-1-benzoylcyclohexane; and benzophenone, Michler's ketone, fluorenone, anthraquinone, xanthone, thioxanthone and acridone, as well as the derivatives of these compounds which are known per se as photoinitiators and are conventionally used as such. The photopolymerization initiators can be present alone or as a mixture with one another in the novel filling compounds. They may also be used together with the activators known per se for these photoinitiators, suitable activators being mainly amine compounds.

Particularly suitable additives and/or assistants, which may be present in the novel filling compounds in amounts from 0 to 70, in particular not more than 50, % by weight, based on the filling compound, are thermal polymerization inhibitors, stabilizers, antioxidants, plasticizers, dyes, pigments and/or fillers. The thermal polymerization inhibitors include, for example, hydroquinone, hydroquinone derivatives, 2,6-di-tert.-butyl-p-cresol, nitrophenols, N-nitrosamines, such as N-nitrosodiphenylamine, and the salts, in particular the alkali metal and aluminum salts, of N-nitrosocyclohexylhydroxylamine. The presence of fillers, eg. glass powder, aluminum oxide, silicon dioxide, silica, alumina, silicates, etc., has proven advantageous because it not only permits any shrinkage during photocuring of the novel filling compound to be compensated or reduced, but also has an advantageous effect on the surface properties of the filled and closed gap. Pigments and dyes may be useful for visual observation during filling of the gap and for assessment of the gap closure. By adding plasticizers, the viscosity and the flow behavior of the novel photocurable filling compounds can be varied and controlled, and important mechanical properties of the cured gap filling, eg. toughness and resilience, can be influenced. Particularly suitable plasticizers are low molecular weight compounds, such as the known phthalates, or hydroxyl-containing compounds, eg. glycerol, ethylene glycol and the like, which are compatible with the components (a) and (b) of the filling compound according to the invention.

Examples of very suitable novel filling compounds are homogeneous photopolymerizable mixtures which contain not only photoinitiators and, if required, additives and/or assistants of the type mentioned above, but also a styrene/maleic halt ester copolymer as the polymeric binder (component (b)) and hydroxyalkyl acrylates and/or hydroxyalkyl methacrylates as photopolymerizable, ethylenically unsaturated low molecular weight compounds (component (a)), in the ratios stated above for these components. These very advantageous novel filling compounds containing styrene/maleic half ester copolymers as the polymeric binder contain as component (a), in particular, a mixture of hydroxyalkyl acrylates and hydroxyalkyl methacrylates, eg. a mixture of 2-hydroxyethyl acrylate and 2-hydroxyethyl methacrylate.

Other examples of very advantageous novel filling compounds which also give very advantageous results are homogeneous mixtures which, in addition to photopolymerization initiators and, if required, additives and/or assistants of the abovementioned type, contain a soluble nylon copolymer as the polymeric binder and (meth)acrylic acid and/or hydroxyalkyl (meth)acrylates as photopolymerizable, ethylenically unsaturated low molecular weight compounds. Particularly suitable nylon copolymers are those mentioned above, which are prepared by co-condensation of a mixture of one or more lactams, in particular caprolactam, and one or more salts of a dicarboxylic acid with a diamine. As the photopolymerizable low molecular weight compound, it is avantageous to use a mixture of (meth)acrylic acid and hydroxyalkyl (meth)acrylates, for example a mixture of acrylic acid and 2-hydroxyethyl methacrylate, the amount of hydroxyalkyl (meth)acrylate in these monomer mixtures generally predominating, and being, for example, about 50–80% by weight, based on the monomer mixture. In the case of these filling compound mixtures too, the amounts in which the individual components of the mixture are present in the filling compound are preferably in the ranges stated generally above for these components.

In general, it has been found that where very great adhesion of the cured filling compound to the gravure printing plate is desirable, particularly advantageous filling compounds are those in which either the photopolymerizable, ethylenically unsaturated low molecular weight compounds of component (a) or the polymeric binders employed as component (b) contain free carboxyl groups. In the preferred mixtures, the amount of free COOH groups in component (a) and/or component (b) is about 0.5–10% by weight, based on the sum of the components (a) and (b), the weight of a free carboxyl group being set at 45.

The individual components of the novel filling compound, in particular components (a) and (b), are matched up with one another so that the resulting homogeneous mixture is free-flowing at room temperature. Accordingly, where polymeric binders which are solid at room temperature are used, the amount of photopolymerizable low molecular weight compounds should be sufficiently high to give a free-flowing homogeneous solution or dispersion of the polymeric binder in the monomers.

Usually, the filling compounds according to the invention are free of solvents, ie. free of liquid non-polymerizable compounds which are readily volatile at room temperature. However, we have found that a small amount, e.g., nor more than about 10% by weight, based on the filling compound, of such readily volatile compounds in the filling compound does not have an adverse effect on the gap closure, and that, after the gap has been closed and the filling compound has undergone curing, the said readily volatile compounds can diffuse out of the cured filling material without adversely affecting the gap closure. Hence, for the purposes of the present invention, solvent-free filling compounds are those which are essentially free of solvents, ie. contain in general less than about 10, preferably less than 2, % by weight of liquid non-polymerizable compounds which are readily volatile at room temperature. Preferred filling compounds are those which do not contain any solvent. Very advantageous solvent-free filling compounds have been found to be those in which the photopolymerizable low molecular weight compounds of component (a) form a homogeneous solution with the polymeric binder of component (b).

The novel photocurable filling compounds are useful for closing the gaps in all gravure printing plates which can be clamped on the forme cylinder of a sheet-fed or web-fed rotary gravure press, for example the conventional metal gravure printing plates possessing a Ballard skin. However, the novel filling compounds are particularly advantageous for closing the gap in gravure printing plates which possess plastic printing layers and are clamped on forme cylinders. In gravure printing plates possessing plastic printing layers, a plastic layer is attached to a suitable base and contains the ink-receiving depressions (wells). These wells can be produced in the plastic printing layer by mechanical engraving or engraving with a laser (cf. for example DE-A-27 52 500 or DE-A-30 28 098) or, in the case of photopolymeric gravure printing plates, can be introduced into the said layer by imagewise exposure and development of a suitable photosensitive recording material (cf. DE-A-20 61 287, DE-A-31 28 949 and DE-A-31 28 951). The novel photocurable filling compound can be very advantageously used in wrap-around gravure printing plates for closing the gap, as formed between the ends of the said plates when the latter are clamped on a forme cylinder. However, it is just as suitable for closing the gaps which result between the end regions and/or lateral edges of the individual gravure printing plates when a plurality of these plates are clamped one behind the other and/or side by side on a single forme cylinder, for example by means of suitable saddle structures known per se. Another particular advantage of the novel photocurable filling compounds is that they permit wide and deep gaps, which may arise between the adjacent edge regions of gravure printing plates when the latter are clamped on a forme cylinder, to be closed easily and very durably. For the purposes of the present invention, gravure printing plates are the ready-prepared gravure printing plates in which the ink-conveying wells have already been introduced, as well as the gravure printing plate blanks in which the wells have not yet been formed. Thus, it is just as possible to clamp a readyprepared gravure printing plate on the forme cylinder and then to fill the resulting gaps with the novel filling compound, or first to clamp a gravure printing plate blank on the forme cylinder, then to fill the resulting gaps with the novel filling compound and only thereafter to introduce the wells into the printing layer of the printing plates. The gravure printing plates are clamped on the forme cylinders in a conventional manner, for example via permanent magnets or mechanical means for fastening and clamping the printing plates. In general, the forme cylinders used for this purpose are those where the gravure printing plates are attached and clamped by hooking and anchoring at least one end of the plate bent over for this purpose, but preferably two such ends, in a groove or a gap in the cylinder.

For closing the gaps which result when gravure printing plates are clamped on the forme cylinders, the novel filling compound can be introduced into the gap by any method or process, provided that uniform and complete filling of the gap cavity is ensured. For example, the filling compound according to the invention can be injected into the gap cavity in a very simple manner by means of a pipette, a syringe or the like. Any excess, overflowing filling material can easily and rapidly be wiped off from the gravure printing plate. It is of course also possible to carry out this injection of the filling compound into the gap cavity by using suitable injection apparatuses incorporating a doctor blade, as has already been proposed for gap closure with other filling materials. The gap may also be closed by introducing the novel filling compound into the gap cavity by the method described in, for example, DE-A-25 45 618. In this method, the gap is covered flush with the adjacent surfaces of the gravure printing plate by means of a shaped bar which has a curved surface and whose curvature has been tailored exactly to that of the lateral surface of the gravure printing cylinder, and the photocurable filling compound is injected into the resulting gap cavity.

In a particularly advantageous method of closing the gaps, which can be carried out in a simple manner using the novel filling compounds and results in gap closures having good surfaces which do not require after-treatment, the gaps which result between the end and/or edge regions of the clamped gravure printing plates are covered flush with the adjacent surfaces of the said plate by placing a flexible sheet-like element, eg. a piece of film or, preferably, a solid, resilient, flexible sheet, on top of the gap, and pressing the sheet-like element onto the surface of the gravure printing plate. The novel photocurable filling compound can then be injected without difficulty into the resulting gap cavity and can then be cured. In this method, the gap is preferably covered using a transparent sheet-like element, so that curing of the filling compound which has been introduced can be effected while the pressed-down sheet-like element is still in position, and the latter is removed only when curing of the filling compound is complete.

When the gaps have been filled, the novel filling compound is cured by exposure to actinic light. For this purpose, all conventional light sources which are capable of emitting light in the wavelength range which is actinic with respect to the filling compounds, in particular about 250–450 nm, can be used, examples being carbon arc lamps, actinic or superactinic fluorescent tubes, low pressure, medium pressure or high pressure mercury lamps which may or may not be doped, xenon lamps, and lasers having a high proportion of UV light.

Figure 2:
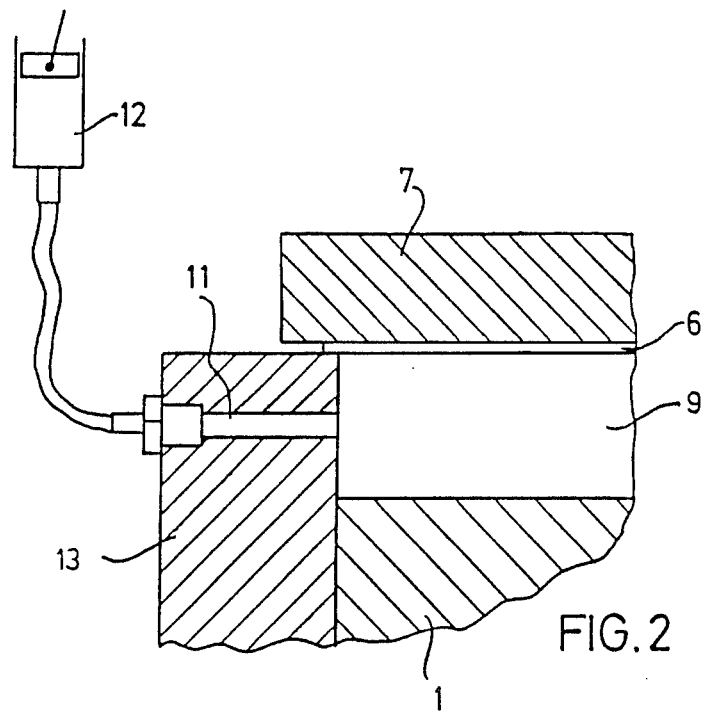
Figure 3:
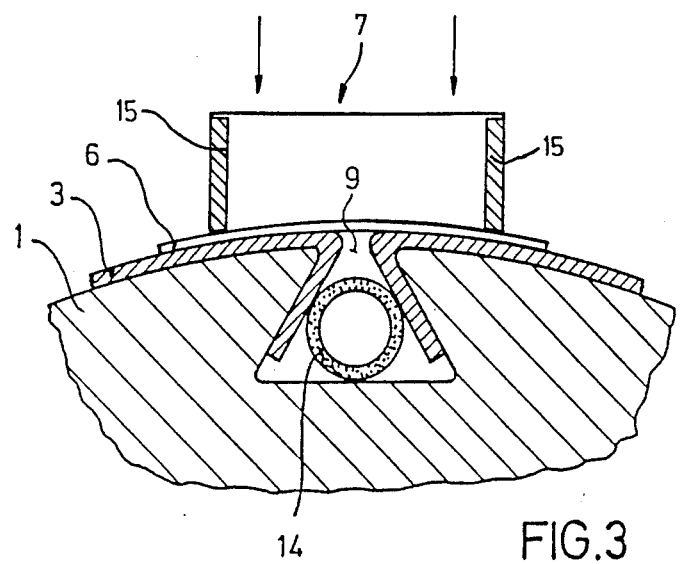
Figure 4:
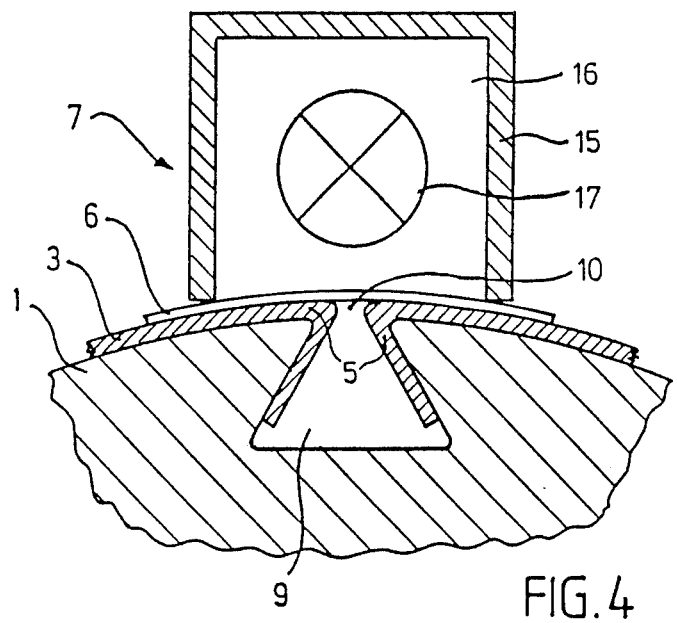

This advantageous method of closing the gaps, which is particularly useful for the novel filling compounds, may be illustrated below with reference to the embodiments shown in the drawing. In the drawing:

FIG. 1 shows a section through a forme cylinder in the region of the groove for hooking in the ends of a gravure printing plate, and a cross-section through a sheet-like element covering the ends and a pressure element on top of this, FIG. 2 shows a forme cylinder as in FIG. 1, but in longitudinal section, FIG. 3 shows a forme cylinder as in FIG. 1, except that the pressure element essentially consists of only two contact elements, and a hollow body having a circular cross-section is arranged in the gap cavity, and FIG. 4 shows a forme cylinder as in FIG. 1, having a radiation source arranged in the pressure element.

The forme cylinder 1 of a sheet-fed or web-fed rotary gravure press is provided at the surface, as shown in FIG. 1, with a groove 2 which runs along the forme cylinder axis and widens from the cylinder surface toward the center of the cylinder, a wrap-around gravure printing plate 3 which is clamped on the forme cylinder 1 and whose ends 4 (both ends in the example illustrated) are bent over being hooked into the said groove at an acute angle. To cover the gap 10, a sheet-like element 6 which extends over the two end sections 5 of the wrap-around gravure printing plate 3 is placed on the surface of the said plate 3. The sheet-like element 6 is, in particular, a transparent, flexible plastic film or resilient flexible plastic sheet, which is preferably transparent to the actinic light used for curing the gap filling, and should be easy to remove from the cured gap filling. The sheet-like element 6 can consist of, for example, a polyester, eg. polyethylene terephthalate or polybutylene terephthalate, a nylon, polystyrene, polyethylene, polypropylene, polyvinyl chloride or, in particular, a polyacrylate or polymethacrylate, and is supported by a movable pressure element 7. The supporting surface 8 of the pressure element 7 can have the same curvature as the surface of the end sections 5 of the gravure printing plate 3, but may also have a different curvature. As shown in FIG. 3, the pressure element 7 can, in particular, also consist of only two parallel contact elements 15 which can be moved to and fro, are arranged at both ends of the gravure printing plate and extend over the entire width of the cylinder. The contact elements 15 can be in the form of, for example, the limbs of a support which has a U-shaped cross-section and is open toward the forme cylinder 1, as shown in FIG. 4; however, as shown in FIG. 3, they may also be in the form of separate strip-like elements, which are advantageously connected to one another by means of a bracing.

The gap cavity 9 formed by covering the gap 10 is filled with the novel photocurable filling compound from the end face of the forme cylinder 1 (FIG. 2), via one or more inlets 11 arranged in its bearing housing 13. A metering apparatus 12, for example a metering piston, is provided for this purpose. To prevent the filling compound from penetrating into the interior of the forme cylinder, in particular into any clamping apparatuses and elements, the gap cavity 9 is closed toward the inside in a radial direction, ie. toward the center of the cylinder, and the said closure may be effected and ensured by purely structural features of the forme cylinder 1. However, it is also possible to seal off the gap cavity 9 by providing a sealing element 14 (FIG. 3) which extends over the entire length of the groove cavity. This sealing element 14 can be compact or, as shown in the drawing, may be a hollow body, eg. a silicone rubber hose. Where a hollow body, preferably having a circular cross-section, is used as sealing element 14, the said body can be connected to a pressure medium source via a further feed (not shown in the drawing) and may hence be inflatable. In this way, it is possible not only to achieve a safe and reliable seal but also to compensate any shrinkage of the cured filling compound. Surprisingly, we have found that, when the novel filling compounds are used, this shrinkage occurs only to an insignificant extent, if at all. If the hollow body 14 is provided with not only a feed but also an outlet, the said body can be connected in a heating medium or cooling medium circulation under pressure in order, for example, to be able to control the flow behavior of the photocurable filling compound during filling of the gap cavity.

When the gap cavity has been filled, the pressure element 7 can be withdrawn, the sheet-like element 6 removed and the filling compound present in the gap cavity then cured by exposure to actinic light. However, it has proven more advantageous to remove the sheet-like element 6 only when curing of the filling compound is complete. In this case, a sheet-like element which is transparent to actinic light is used, and the gap cavity 9 filled with the novel filling compound is exposed to actinic light through the sheet-like element 6, with the pressure element 7 in the lower position and exerting a contact pressure. For example, this can be done, as shown in FIG. 4, if the pressure element 7 consists of a support which has a U-shaped cross-section and is open toward the forme cylinder 1, and whose limbs 15 press the sheet-like element 6 onto the surface of the gravure printing plate 3. A source 17 of actinic light is arranged in the cavity 16 of the open support. The cavity 16 may be filled with a material which is transparent to actinic light, eg. a casting resin. It is thus possible, in one operation, to press the resilient flexible sheet-like element 6 onto the surface of the clamped wrap-around gravure printing plate 3 by means of the pressure element 7, to introduce the novel photocurable filling compound into the resulting gap cavity 9 which is closed flush with the cylinder surface, and then to cure the filling compound directly by exposure to actinic light, while the resilient flexible sheet-like element 6 remains pressed on the surface of the said plate 3 by the pressure element 7. A similarly simple and elegant method is of course one in which the pressure element 7, as shown in FIG. 3, consists essentially of only two separate contact elements 15, exposure to actinic light readily being effected in this case by introducing a radiation source between the two contact elements 15.

When curing of the filling compound is complete, the pressure element 7 is withdrawn and the sheet-like element 6 is removed. If it should prove necessary in order to permit easy removal of the sheet-like element 6 from the cured filling compound, the said element 6 can be treated on the surface with a non-stick agent, for example may be siliconized. The method described gives a satisfactory gap closure which closes the surfaces of the two end sections 5 of the gravure printing plate 3 in a flush and firm manner, does not require subsequent processing and permits trouble-free printing, even by the web-fed rotary method.

The Examples which follow illustrate the invention.

EXAMPLE 1

21 g of a styrene/maleic half ester copolymer and 0.7 g of benzil dimethyl ketal were dissolved in 50 g of hydroxyethyl acrylate. The material, which is honey-like at room temperature, was injected into the gap cavity formed when the end sections of a wrap-around gravure printing plate possessing a plastic printing layer and clamped on a forme cylinder were covered flush with a polyester film. The gap filling was then cured by irradiation with a UV fluorescent tube, after which the polyester film was removed. The cylinder prepared in this manner was used for printing on an Albertina gravure printing press. The gap closure did not give rise to any problems at all during printing and was still satisfactory after more than 50,000 prints.

EXAMPLE 2

50 g of a nylon copolymer and 4.5 g of benzil dimethyl ketal were dissolved in 100 g of acrylic acid, and 100 g of hydroxyethyl acrylate, 100 g of hydroxyethyl methacrylate and 100 g of glycerol were stirred into this solution. This material was used, as described in Example 1, to close the gap between the ends of a wrap-around gravure printing plate possessing a plastic printing layer and clamped on a forme cylinder. The printing characteristics of the cylinder prepared in this manner were similar to those of the cylinder described in Example 1.

We claim:

1. A process for closing the gaps which result between the end or edge regions of gravure printing plates when the latter are clamped on forme cylinders comprising, filling the gaps which result when gravure printing plates are clamped on the forme cylinders with a photocurable filling composition consisting essentially of a homogenous, solvent-free, photopolymerizable mixture which is free-flowing at room temperature and contains the following components:

(a) from 10 to 90% by weight of one or more hydrophilic, polar, photopolymerizable, ethylenically unsaturated low molecular weight compounds, (b) from 5 to 65% by weight of one or more styrene/maleic halfester copolymers or one or more styrene/maleic halfester copolymers which additionally contain maleic anhydride and (meth)acrylates as copolymerized units, or linear synthetic nylons or a linear, synthetic, soluble nylon having a K value (according to Kikentscher) of from 20 to 80 which copolymers and nylons are resistant to toluene-containing, gasoline-containing ketone-containing or ester-containing solvents and are compatible with the photopolymerizable low molecular weight compounds of component (a), (c) from 0.01 to 10% by weight of one or more photopolymerization initiators and (d) from 0 to 70% by weight of one or more compounds selected from the group consisting of thermal polymerization inhibitors, stabilizers antioxidants, plasticizers, dyes, pigments and fillers; and curing the filling composition by exposure to actinic light to close the gaps.

2. The process of claim 1, wherein the resulting gaps are filled with a composition containing monofunctional monomers having only one photopolymerizable double bond, or a mixture of these monofunctional monomers with a minor amount of polyunsaturated monomers as component (a).

3. The process of claim 1, wherein the resulting gaps are filled with a composition containing at least one monomer of the group consisting of N-vinyl monomers, (meth)acrylic acid, hydroxyl (meth)acrylates or (meth)acrylamide as component (a).

4. The process of claim 1, wherein the resulting gaps are filled with a composition containing styrene/maleic half ester copolymers as component (b).

5. The process of claim 4, wherein the resulting gaps are filled with a composition containing hydroxyalkyl acrylates, hydroxyalkyl methacrylates or mixtures thereof as component (a) and a styrene/maleic halfester copolymer as component(b).

6. The process of claim 1, wherein the resulting gaps are filled with a composition containing a linear synthetic, soluble nylon copolymer having a K-value (according to Fikentscher) of from 20 to 80 as component (b).

7. The process of claim 1, wherein the resulting gaps are filled with a composition containing a mixture of (meth)acrylic acid and hydroxyalkyl (meth)acrylates as component (a) and a linear, synthetic, soluble nylon copolymer as component (b).

8. The process of claim 1, wherein the resulting gaps are filled with a composition in which at least one of components (a) and (b) contain free carboxy groups.

9. The process of claim 1, wherein the resulting gaps are filled with a composition in which component (d) contains fillers.

* * * * *